United States Patent
Hsieh et al.

(10) Patent No.: US 7,679,899 B2
(45) Date of Patent: Mar. 16, 2010

(54) HOST WITH REMOVABLE DEVICE

(75) Inventors: Kuei-Chou Hsieh, Taipei (TW); Yung-Shou Lee, Taipei (TW); Chen-Jie Wu, Taipei (TW); Hsiang-Yun Lu, Taipei (TW)

(73) Assignee: Inventec Corporation, Taipei (TW)

( * ) Notice: Subject to any disclaimer, the term of this patent is extended or adjusted under 35 U.S.C. 154(b) by 23 days.

(21) Appl. No.: 12/250,845

(22) Filed: Oct. 14, 2008

(65) Prior Publication Data
US 2010/0031279 A1 Feb. 4, 2010

(30) Foreign Application Priority Data
Jul. 31, 2008 (TW) ............... 97129123 A (51) Int. Cl.
*G06F 1/16* (2006.01)
(52) U.S. Cl. ................................. 361/679.38
(58) Field of Classification Search ............ 361/679.38
See application file for complete search history.

(56) References Cited

U.S. PATENT DOCUMENTS

| 5,324,204 A * | 6/1994 | Lwee .................... 361/679.38 |
| 5,692,208 A * | 11/1997 | Felcman et al. ........ 361/679.38 |
| 5,825,616 A * | 10/1998 | Howell et al. .......... 361/679.38 |
| 5,831,820 A * | 11/1998 | Huang .................... 361/679.38 |
| 5,889,649 A * | 3/1999 | Nabetani et al. ....... 361/679.38 |
| 6,411,505 B1 * | 6/2002 | DiFonzo et al. ........ 361/679.38 |
| 6,452,787 B1 * | 9/2002 | Lu et al. ................. 361/679.38 |
| 6,606,241 B2 * | 8/2003 | Moore .................... 361/679.58 |
| 6,643,139 B2 * | 11/2003 | Tien ....................... 361/679.38 |
| 6,980,428 B2 * | 12/2005 | Ting ....................... 361/679.36 |
| 6,992,886 B2 * | 1/2006 | Salinas et al. .......... 361/679.38 |
| 7,589,961 B2 * | 9/2009 | Jiang et al. ............. 361/679.38 |
| 2006/0227501 A1 * | 10/2006 | Lin ............................. 361/685 |

* cited by examiner

*Primary Examiner*—Lisa Lea-Edmonds
(74) *Attorney, Agent, or Firm*—Rabin & Berdo, P.C.

(57) ABSTRACT

A host with a removable device includes a main body, a removable device, and a fixing and withdrawing mechanism. Each element of the fixing and withdrawing mechanism is connected with each other by using a plurality of springs. When the removable device is placed into the host, a slide rod is pushed and a link rod is linked, such that the removable device is fastened in the host by using the link rod. When a user pulls an actuating rod, the link rod is guided to release the fastening state, and the removable device is ejected by using the slide rod under the forces of the springs.

7 Claims, 12 Drawing Sheets

HOST WITH REMOVABLE DEVICE

CROSS-REFERENCE TO RELATED APPLICATIONS

This non-provisional application claims priority under 35 U.S.C. §119(a) on Patent Application No(s). 097129123 filed in Taiwan, R.O.C. on Jul. 31, 2008 the entire contents of which are hereby incorporated by reference.

BACKGROUND OF THE INVENTION

1. Field of the Invention

The present invention relates to a host with a removable device, and more particularly to a host with a removable device having a fixing and withdrawing mechanism.

2. Related Art

As the information industry has been developed rapidly, the applications of electronic and information products are increasingly popularized, and the consumers have an increasingly high demand on the electronic products. In order to meet the demand of the consumers, recently, the electronic product has been developed towards a miniaturization design trend, so as to be carried conveniently and save the accommodation space. Since the small-scale electronic product (for example, a laptop and a personal digital assistant) has a small volume, it is generally restricted due to a limited available space when the relevant peripherals (for example, a floppy drive (FD), a hard disk drive (HDD), a compact disc-read only memory (CD-ROM), a compact disc-rewritable (CD-RW), and a digital versatile disc (DVD)) need to be expanded to enhance the functions of the computer.

In order to eliminate the restriction on the available space, recently, one solution of configuring the peripherals as a removable device has been proposed. Here, taking a notebook computer and a removable CD-ROM as an example, an accommodation space is opened in a case of the notebook computer, the removable CD-ROM is disposed in the accommodation space through a frame, and an opening communicated with an accommodation slot in the frame is disposed on one end of the frame, such that the CD-ROM is installed in the accommodation slot via the opening. On a side edge of the accommodation slot, a clipping element assembly region parallel with the side edge is disposed. A sliding element capable of moving away from or approaching the opening and a first fastening element capable of approaching or moving away from the CD-ROM are disposed on the clipping element assembly region. After the CD-ROM is installed in the accommodation slot, the sliding element is moved to drive the fastening element to slide accordingly, so as to further lean against the CD-ROM, thereby clipping the CD-ROM on a fixing position. Alternatively, the fastening element is made to be separated from the CD-ROM, such that the CD-ROM is detached from the frame. In addition, a first snapping element is disposed on a bottom of the frame, and a second snapping element matching with the first snapping element is disposed on the case of the computer. The frame is detached from the case of the computer through the first snapping element and the second snapping element.

Therefore, if the user intends to take out the removable CD-ROM from the case of the computer, the user must thrusts the first snapping element on a bottom of the frame. As a result, the frame with the removable CD-ROM assembled thereon is separated from the case of the computer. Next, the removable CD-ROM is disassembled through clipping elements (for example, screws) disposed on the frame. The above manner is quite labor-consuming, and when the thrust is applied, the user must be take care to avoid the shaking of the host of the computer and to prevent the damaging of the parts fixed inside the case. Meanwhile, the disassembling process is quite time-consuming, which cannot meet the requirements from the consumers for quickly and conveniently replacing or disassembling the computer peripherals.

SUMMARY OF THE INVENTION

In view of the above problems, the present invention is directed to a host with a removable device, thereby solving the problem about the inconveniences in replacing or disassembling the removable device from the host.

A host with a removable device is provided in the present invention, which includes a main body, a removable device, and a fixing and withdrawing mechanism. The main body has an accommodation space for accommodating the removable device. The removable device slides between a fixing position and a withdrawing position with respect to the main body. The removable device has a clasping block that fastens the removable device in a fixing position. The fixing and withdrawing mechanism is fixed on the main body. The fixing and withdrawing mechanism includes a slide rod, a link rod and an actuating rod. When the removable device is assembled in the accommodation space, a slide rod of the fixing and withdrawing mechanism is pushed by the clasp block of the removable device, such that the slide rod is pushed from a returning position to a pushed position, and meanwhile a link rod of the fixing and withdrawing mechanism is driven to move from a releasing position to a clipping position, such that the link rod clips the clasp block on the fixing position, thereby fixing the removable device on the main body. When an actuating rod of the fixing and withdrawing mechanism is pulled to move from a rebounding position to a pulling position, the actuating rod guides the link rod at the same time, so that the link rod is pushed back to the releasing position. Meanwhile, the slide rod of the fixing and withdrawing mechanism slides from the pushed position to the returning position, so that the removable device is moved to the withdrawing position, and thus, the removable device is taken out from the main body.

In the present invention, the user only apply a force to the actuating rod, and pull the actuating rod to move from the rebounding position to the pulling position, such that the removable device is withdrawn out of the main body, which is quite convenient in operation. Each element of the fixing and withdrawing mechanism of the present invention is combined by means of snapping, and the removable device is fixed into or withdrawn out of the host through cooperative effects among the springs, which can be finished without a locking step using screws and the like, so as to reduce the assembly complexity and simplify the production flow.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
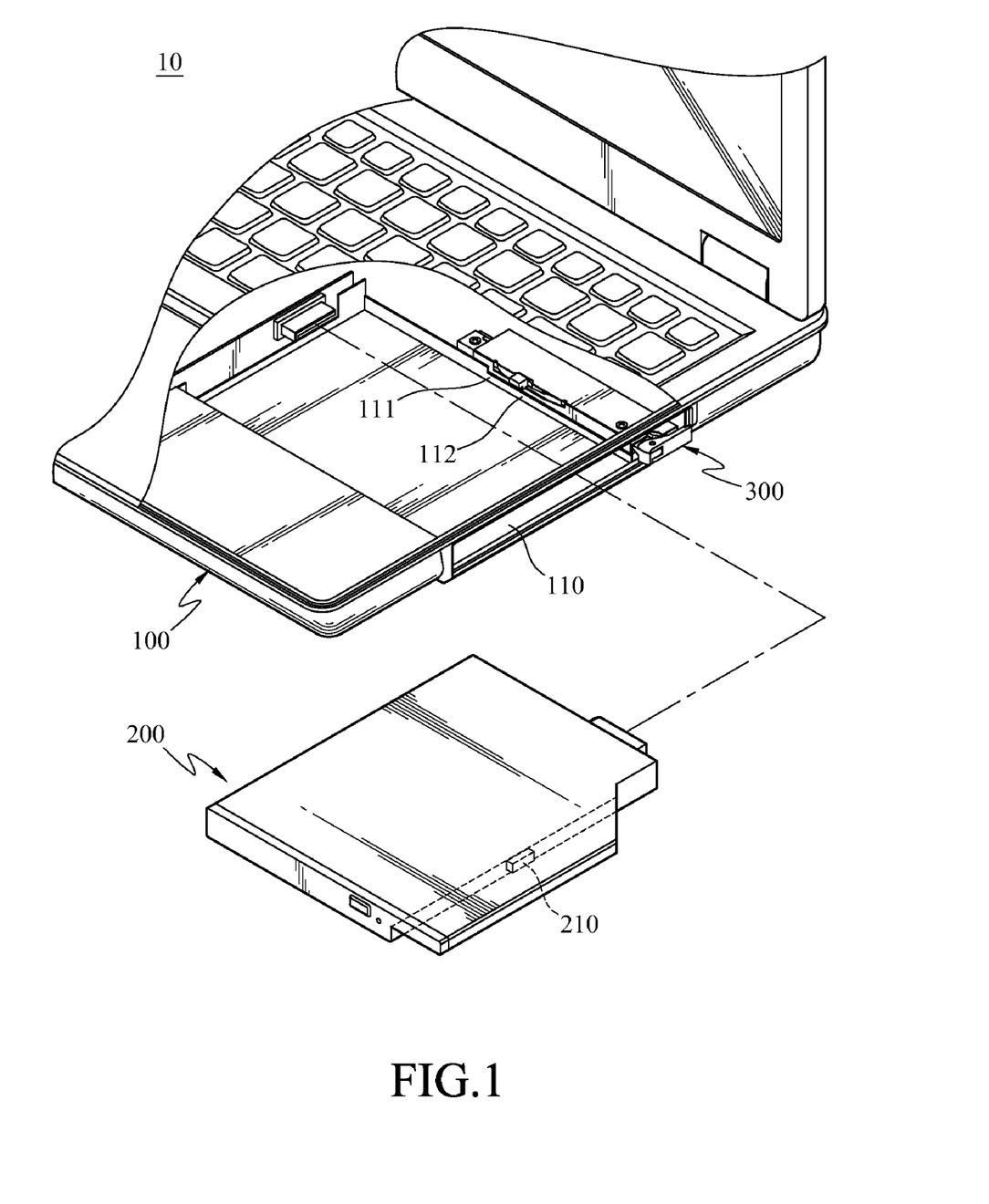
FIG. 1 is a schematic three-dimensional exploded view of a first embodiment of the present invention.

FIG. 1 is a schematic three-dimensional exploded view of a first embodiment of the present invention. Referring to FIG. 1, a host with a removable device 10 of the present invention includes a main body 100, a removable device 200, and a fixing and withdrawing mechanism 300. The main body 100 has an accommodation space 110 for accommodating the removable device 200. The removable device 200 has a clasp block 210, and the removable device 200 slides between a fixing position 111 and a withdrawing position 112 in the accommodation space 110. The fixing and withdrawing mechanism 300 is used to make the removable device 200 be fixed into or withdrawn out of the main body 100, and the fixing and withdrawing mechanism 300 is further described below in detail.

The host in the present invention refers to a body of a computer capable of accommodating peripherals. The removable device refers to a removable electronic device of the computer peripherals, for example, an FD, an HDD, a CD-ROM, a CD-RW, a DVD, and a cell module. In order to reduce a total weight of the body of the computer, the removable electronic device may be replaced by a plastic module. The above descriptions are merely intended for demonstration, and the present invention is not limited here.

Figure 2:
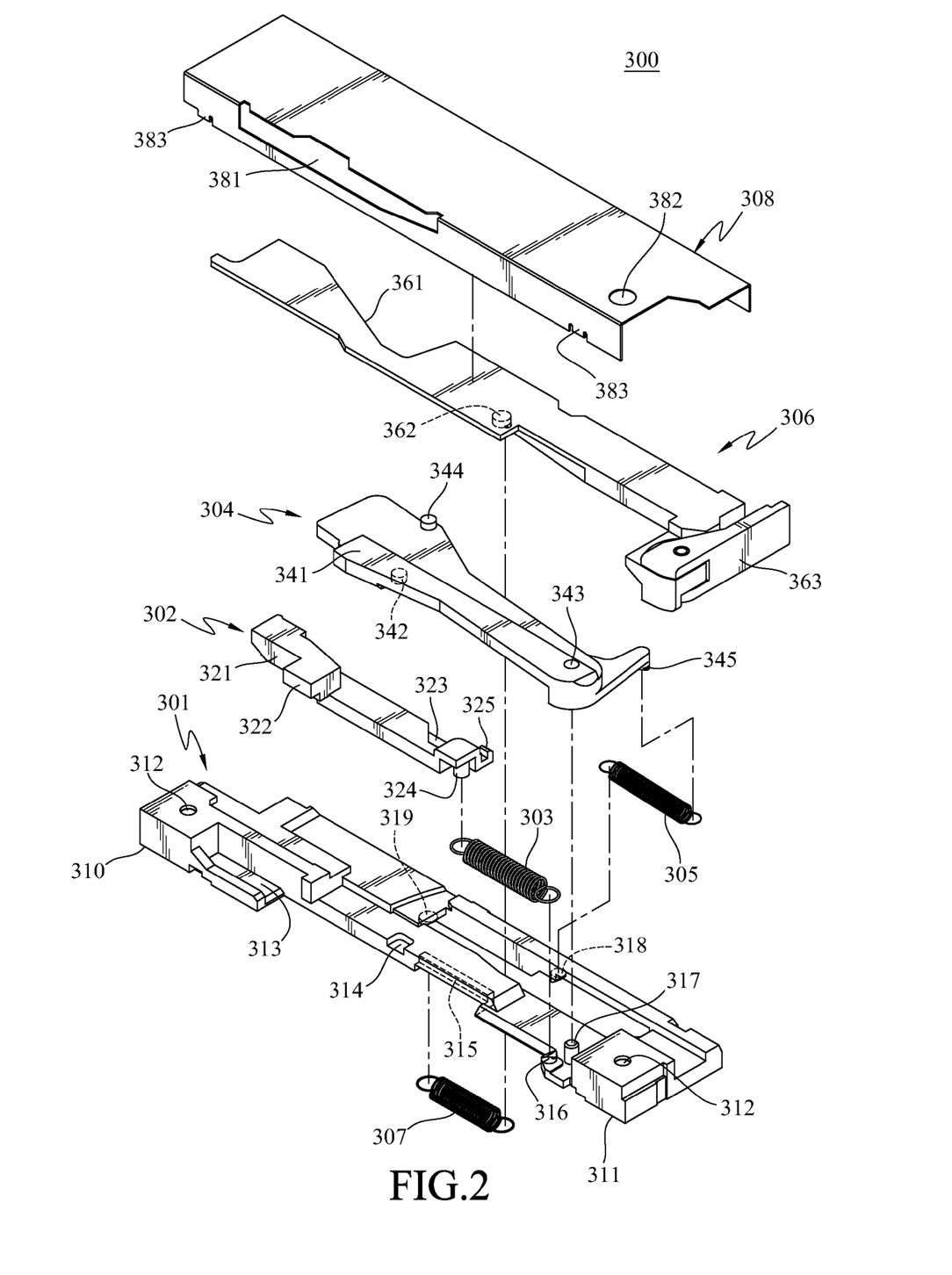
FIG. 2 is a schematic three-dimensional exploded view of a fixing and withdrawing mechanism according to the first embodiment of the present invention.

FIG. 2 is a schematic three-dimensional exploded view of the fixing and withdrawing mechanism according to the first embodiment of the present invention. Referring to FIG. 2, the fixing and withdrawing mechanism 300 of the present invention includes a base 301, a slide rod 302, a first spring 303, a link rod 304, a second spring 305, an actuating rod 306, a third spring 307, and a cover plate 308.

The base 301 has a first end 310 and a second end 311. A positioning hole 312 is respectively disposed on the first end 310 and the second end 311, for fixing the base 301 on the main body 100. A shifting slot 313, a receiving region 314, a slide rail 315, a first connection junction 316, and a pivot shaft 317 are disposed on one side of the base 301 in sequence from the first end 310 to the second end 311, and a second connection junction 318 and a third connection junction 319 are disposed on one side of the base 301 opposite to the slide rail 315.

Figure 3A:
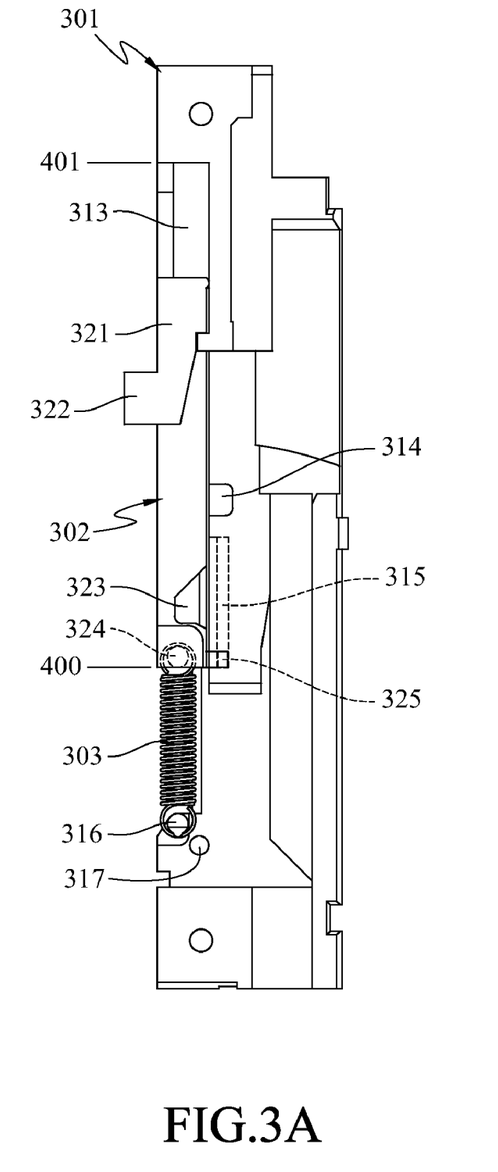
FIG. 3A is a schematic view of the fixing and withdrawing mechanism according to the first embodiment of the present invention, when a slide rod of the fixing and withdrawing mechanism is at a returning position.
Figure 3B:
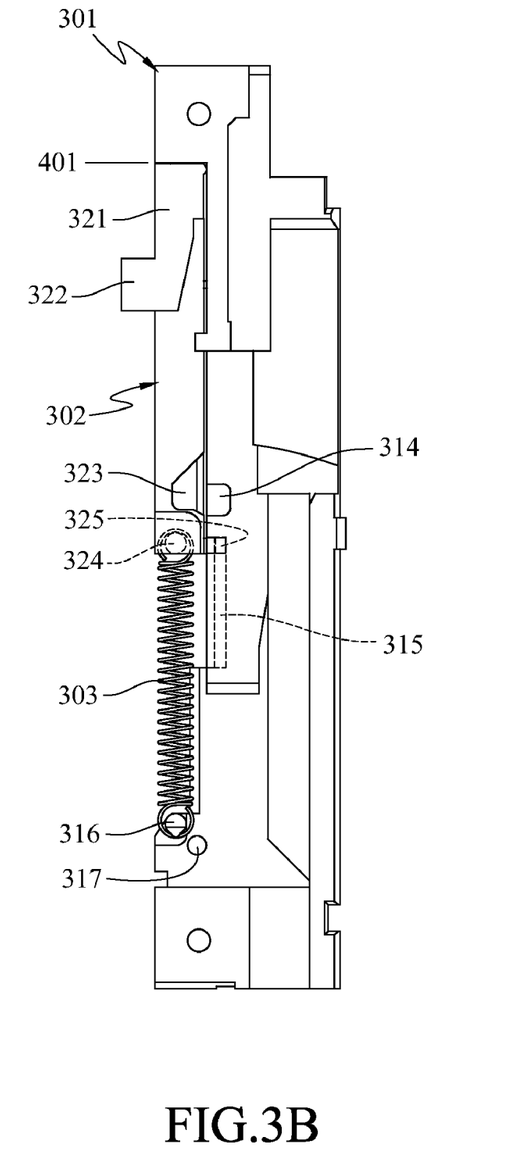
FIG. 3B is a schematic view of the fixing and withdrawing mechanism according to the first embodiment of the present invention, when the slide rod of the fixing and withdrawing mechanism is at a pushed position.

Referring to FIGS. 3A and 3B, a slide block 321 and a push block 322 are disposed on one end of the slide rod 302, and a limiting region 323, a sleeve junction 324, and a hook 325 are disposed on the other end thereof. The slide block 321 is snapped in the shifting slot 313 of the base 301, such that the slide rod 302 slides between a returning position 400 and a pushed position 401 with respect to the base 301. The hook 325 hooks the slide rail 315 of the base 301, so as to maintain the sliding motion of the slide rod 302 with respect to the base 301 as a linear movement parallel with the base 301.

One end of the first spring 303 is sleeved on the first connection junction 316 of the base 301, and the other end is sleeved on the sleeve junction 324 of the slide rod 302. The first spring 303 pushes the slide rod 302 to the returning position 400 under a normal state.

Figure 4A:
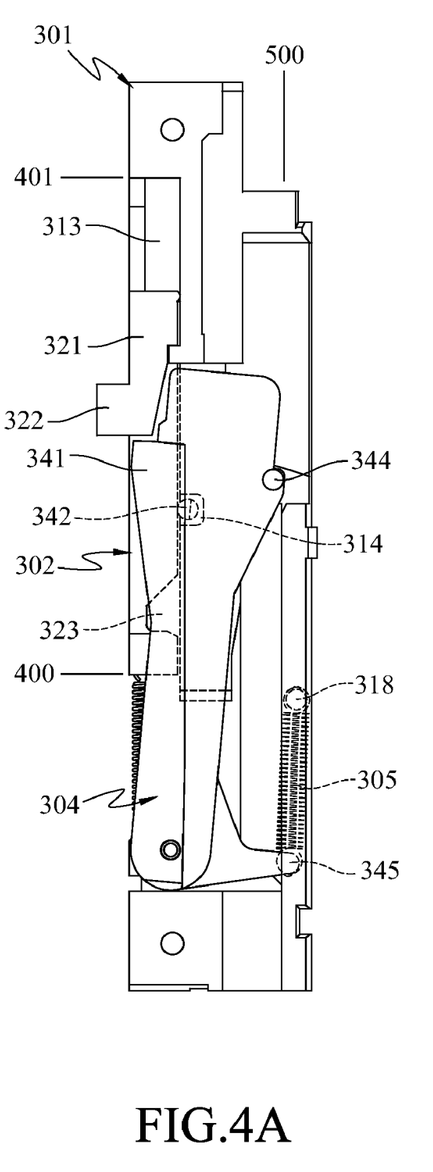
FIG. 4A is a schematic view of the fixing and withdrawing mechanism according to the first embodiment of the present invention, when a link rod of the fixing and withdrawing mechanism is at a releasing position.
Figure 4B:
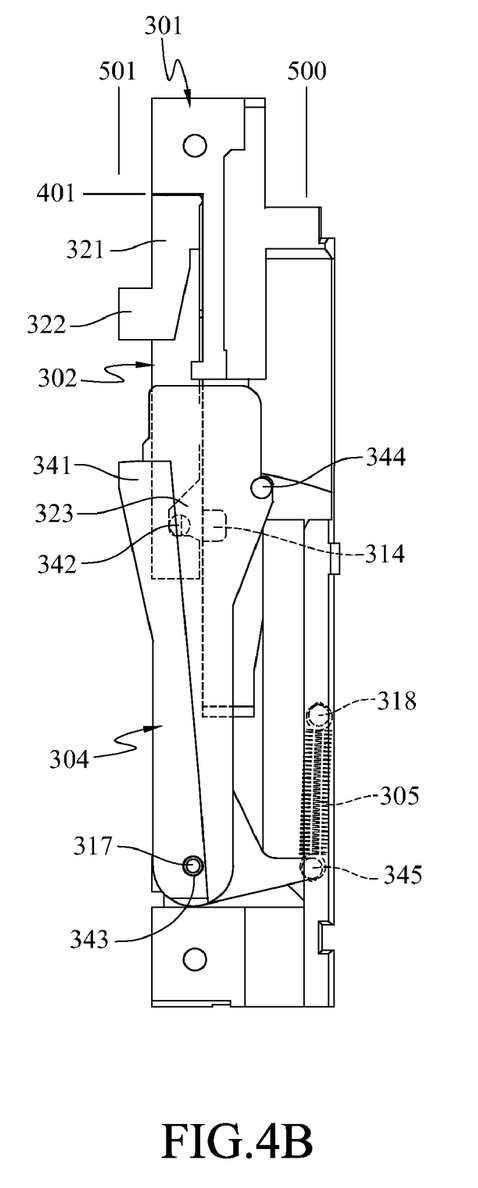
FIG. 4B is a schematic view of the fixing and withdrawing mechanism according to the first embodiment of the present invention, when the link rod of the fixing and withdrawing mechanism is at a clipping position.

Referring to FIGS. 4A and 4B, a stopper portion 341, a positioning column 342, and a shaft hole 343 are sequentially disposed on one side of the link rod 304, and a protruding column 344 and a sleeve junction 345 are respectively disposed on one side of the link rod 304 opposite to the stopper portion 341 and the shaft hole 343. The shaft hole 343 is pivoted on the pivot shaft 317 of the base 301, such that the link rod 304 pivotally rotates between a releasing position 500 and a clipping position 501 on the base 301. When the link rod 304 is at the releasing position 500, the slide rod 302 is at the returning position 400, the link rod 304 leans against the slide rod 302, and meanwhile the positioning column 342 of the link rod 304 is clipped in the receiving region 314 of the base 301. When the link rod 304 is at the clipping position 501, the slide rod 302 is at the pushed position 401, and the positioning column 342 of the link rod 304 is pushed in the limiting region 323 of the slide rod 302.

One end of the second spring 305 is sleeved on the second connection junction 318 of the base 301, and the other end is sleeved on the sleeve junction 345 of the link rod 304. The second spring 305 pushes the link rod 304 to the clipping position 501 under a normal state. Therefore, when the slide rod 302 is at the returning position 400, the link rod 304 is pushed to the releasing position 500, such that the link rod 304 leans against the slide rod 302, the positioning column 342 thereof is clipped in the receiving region 314 of the base 301, and thus, the second spring 305 is in a stretched state.

Figure 5A:
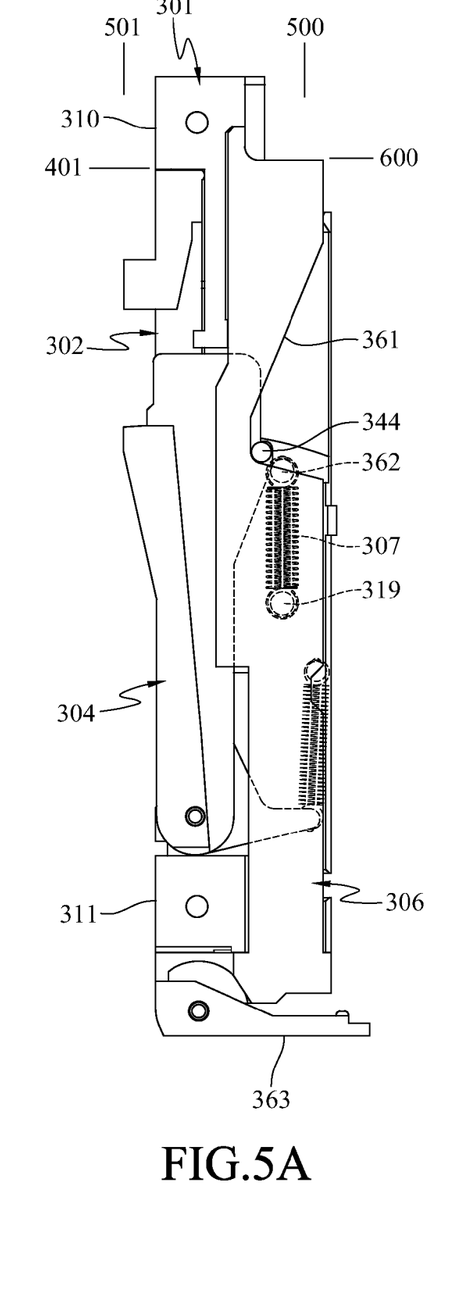
FIG. 5A is a schematic view of the fixing and withdrawing mechanism according to the first embodiment of the present invention, when an actuating rod of the fixing and withdrawing mechanism is at a rebounding position.
Figure 5B:
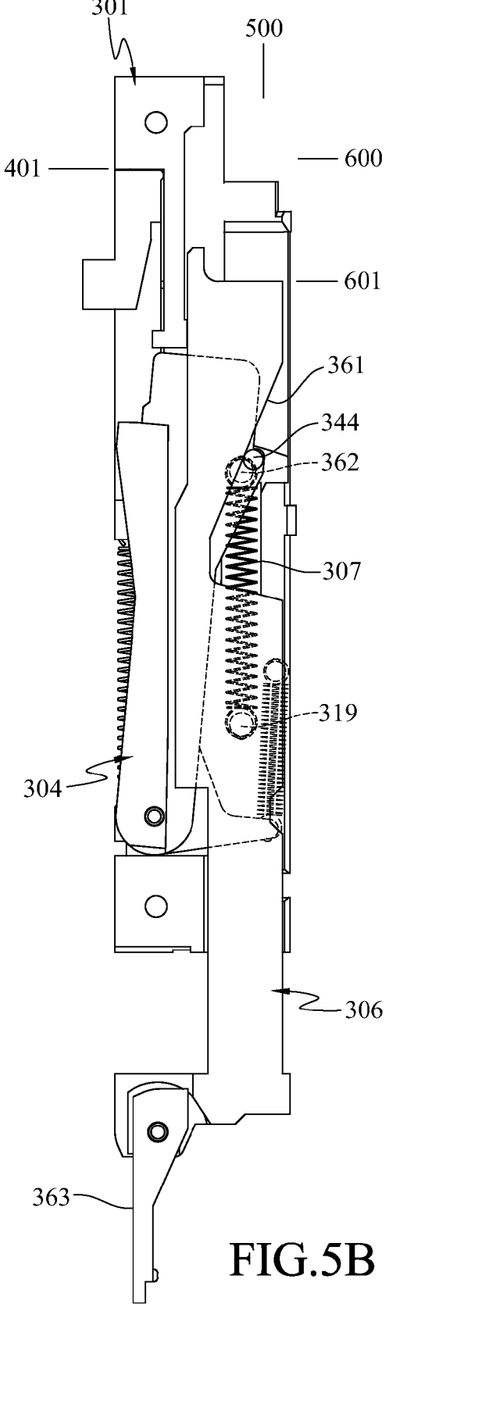
FIG. 5B is a schematic view of the fixing and withdrawing mechanism according to the first embodiment of the present invention, when the actuating rod of the fixing and withdrawing mechanism is at a pulling position.
Figure 6:
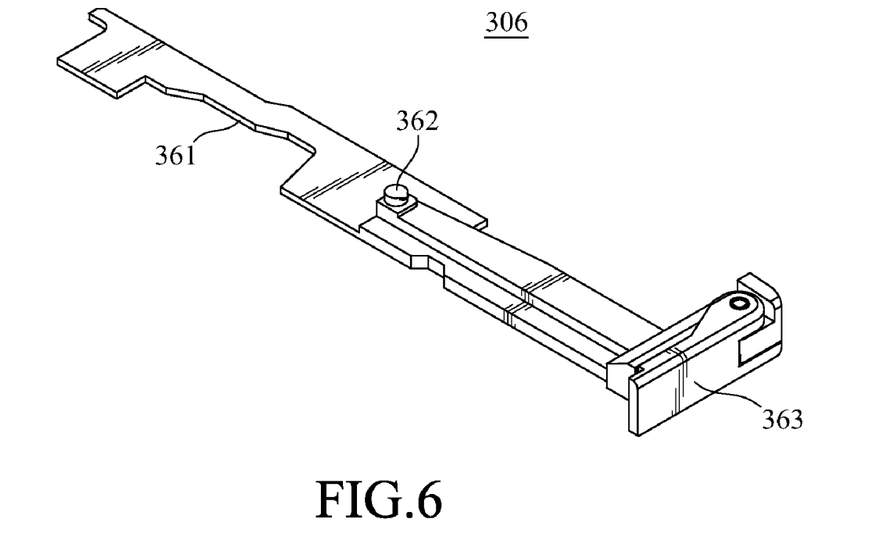
FIG. 6 is a schematic view of the fixing and withdrawing mechanism according to the first embodiment of the present invention, in which a guide surface of the actuating rod of the fixing and withdrawing mechanism has a ladder surface.

Referring to FIGS. 5A and 5B, the actuating rod 306 is slidingly disposed on the base 301, and slides between a rebounding position 600 and a pulling position 601 with respect to the base 301. The actuating rod 306 has a guide surface 361, a sleeve junction 362, and a handle 363. The guide surface 361 may be a slant or a ladder surface (as shown in FIG. 6), and contacts with the protruding column 344 of the link rod 304. When the actuating rod 306 is at the rebounding position 600, the handle 363 is pivoted on one end opposite to the guide surface 361, and exposes the second end 311 of the base 301. When the actuating rod 306 is at the pulling position 601, the link rod 304 is at the releasing position 500.

One end of the third spring 307 is sleeved on the third connection junction 319 of the base 301, and the other end is sleeved on the sleeve junction 362 of the actuating rod 306. The third spring 307 pushes the actuating rod 306 towards the rebounding position 600 under a normal state.

Referring to FIG. 2 once again, the cover plate 308 has a notch 381, a through hole 382, and a plurality of buckling pieces 383. The notch 381 is disposed on one side of the slide rod 302 opposite to the push block 322, such that the push block 322 is protruded out of the notch 381. The through hole 382 corresponds to the positioning hole 312 of the second end 311 of the base 301. The buckling pieces 383 are used to buckle with the base 301.

Figure 7:
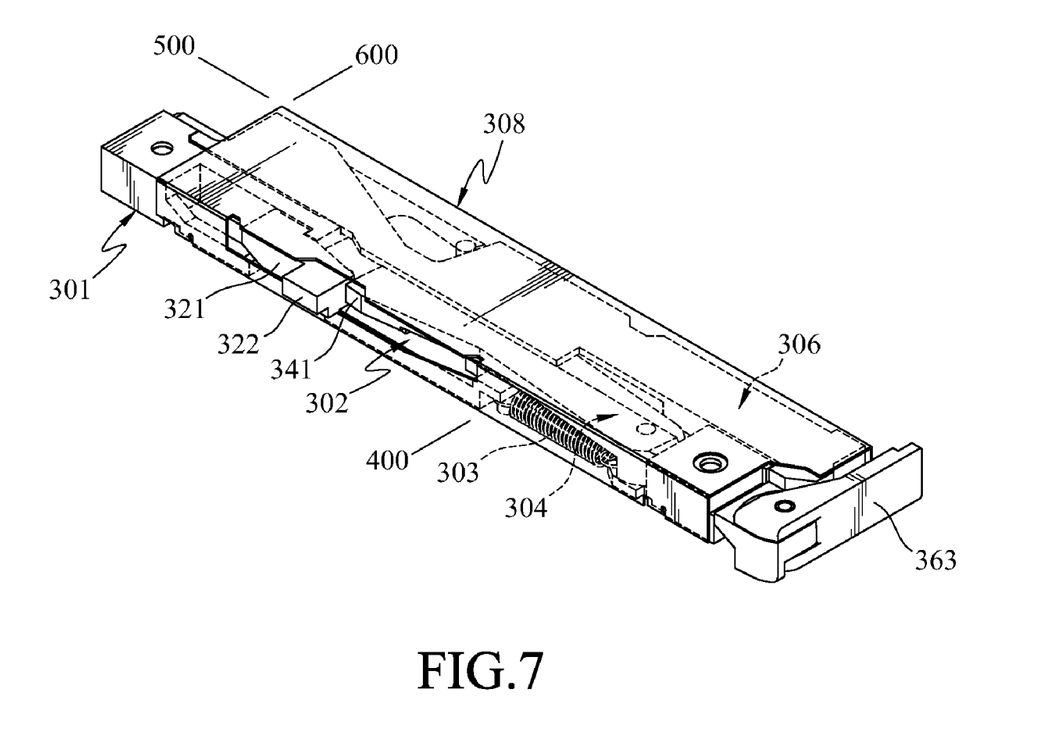
FIG. 7 is a schematic three-dimensional combined view of the fixing and withdrawing mechanism according to the first embodiment of the present invention.

FIG. 7 is a three-dimensional combined view of the fixing and withdrawing mechanism according to the present invention. Referring to FIG. 7, in the fixing and withdrawing mechanism 300 of the present invention, the cover plate 308 is buckled with one side of the base 301, and wraps the actuating rod 306, the link rod 304, and the slide rod 302 on the base 301, so as to limit the actuating rod 306 and the slide rod 302 to slide between the cover plate 308 and the base 301 and limit the link rod 304 to pivotally rotate between the cover plate 308 and the base 301. Here, the first spring 303 pushes the slide rod 302 towards the returning position 400 under a normal state, and makes the link rod 304 lean against the slide rod 302, such that the link rod 304 is at the releasing position 500, and the third spring 307 (not shown) pushes the actuating rod 306 towards the rebounding position 600 under a normal state.

Actuation relations among various elements of the fixing and withdrawing mechanism 300 can be known with reference to FIGS. 3A to 5B. When an external force is applied to the push block 322 of the slide rod 302, the push block 322 moves along the shifting slot 313 of the base 301, so that the slide rod 302 is moved from the returning position 400 to the pushed position 401. Due to the moving of the slide rod 302, the leaning state between the slide rod 302 and the link rod 304 is released. Furthermore, the link rod 304 is forced to pivotally rotate from the releasing position 500 to the clipping position 501 under a restoring force of the second spring 305. Meanwhile, the positioning column 342 of the link rod 304 moves from the receiving region 314 of the base 301 to the limiting region 323 of the slide rod 302, and the link rod 304 is pushed to the clipping position 501. When a pulling force from the first end 310 of the base 301 to the second end 311 is applied to the handle 363 of the actuating rod 306, the actuating rod 306 is forced to move from the rebounding position 600 with respect to the base 301 towards the pulling position 601. In this case, the guide surface 361 of the actuating rod 306 guides the protruding column 344 of the link rod 304 to move along a contact surface between the guide surface 361 and the protruding column 344, so as to drive the link rod 304 to move from the clipping position 501 to the releasing position 500.

When the applied external force is removed, the slide rod 302 is forced to move from the pushed position 401 to the returning position 400 under the restoring force of the first spring 303, such that the link rod 304 is pushed to the releasing position 500 once again by the slide block (as shown in FIG. 7).

Figure 8:
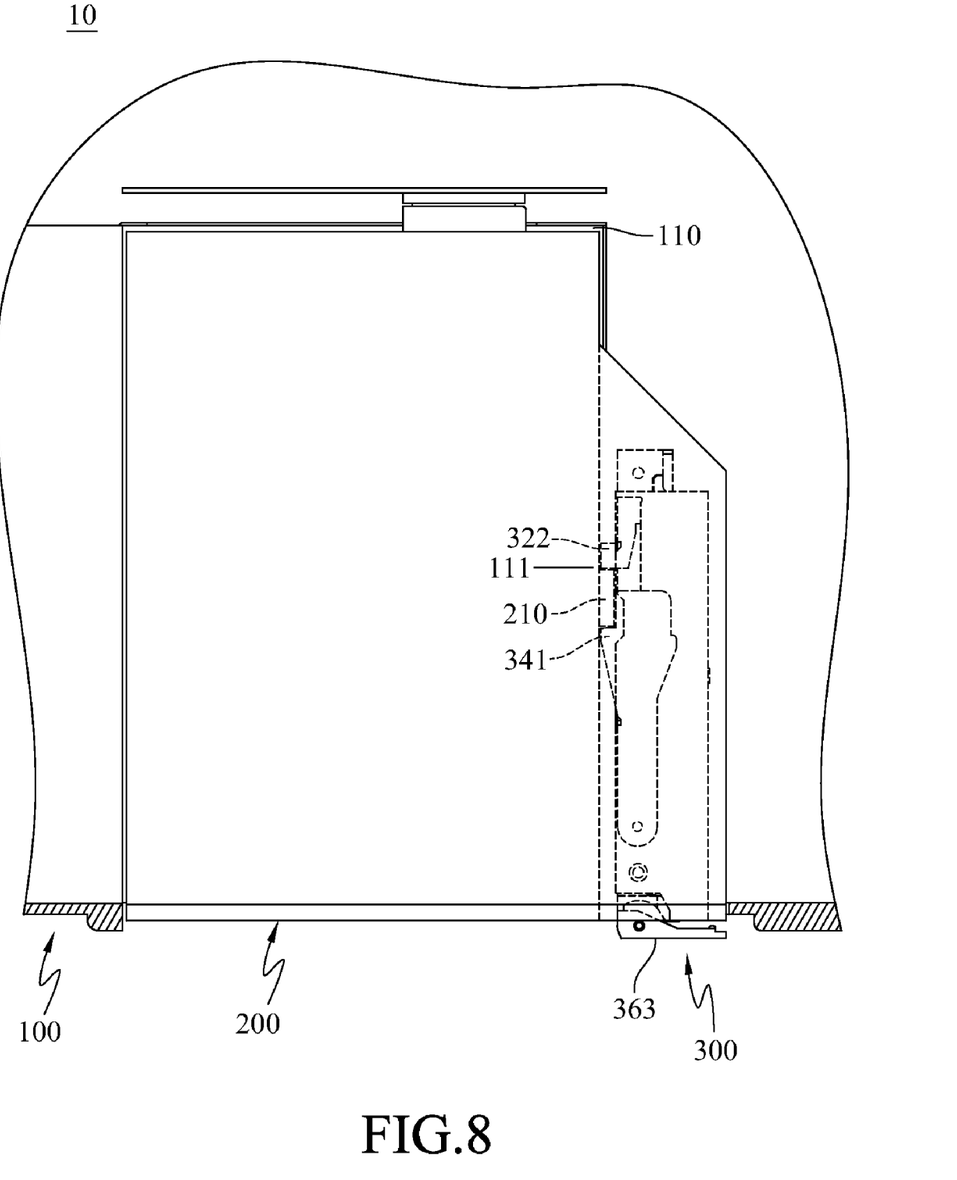
FIG. 8 is a schematic view of fixing a removable device according to the first embodiment of the present invention.
Figure 9:
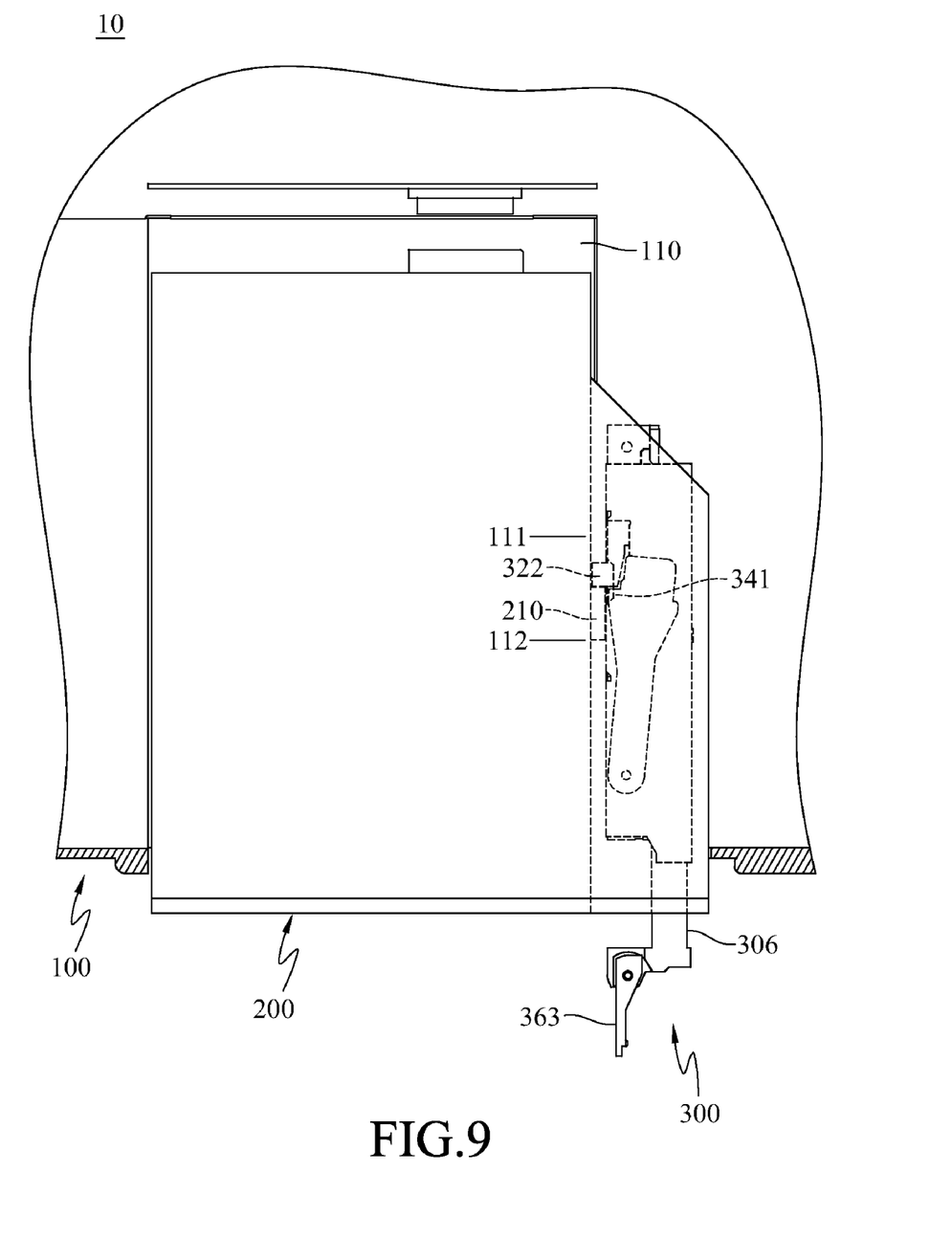
FIG. 9 is a schematic view of withdrawing the removable device according to the first embodiment of the present invention.

FIGS. 8 and 9 are schematic views of operations in the first embodiment of the present invention. Referring to FIGS. 8 and 9, one side of the removable device 200 of the present invention has a clasp block 210. When the removable device 200 is placed into the accommodation space 110 of the main body 100 and is pushed to reach the fixing position 111, the clasp block 210 pushes against the push block 322 of the fixing and withdrawing mechanism 300, such that the slide rod 302 of the fixing and withdrawing mechanism 300 is pushed from the returning position 400 to the pushed position 401 (as shown in FIGS. 3A and 3B), and meanwhile, the leaning state between the slide rod 302 and the link rod 304 of the fixing and withdrawing mechanism 300 is released, such that the link rod 304 is forced to pivotally rotate from the releasing position 500 to the clipping position 501 under the restoring force of the second spring 305, so as to fasten the clasp block 210 on the fixing position 111 in the accommodation space 110 (as shown in FIGS. 4A and 4B).

Therefore, the removable device 200 is accommodated in the main body 100 through the fixing and withdrawing mechanism 300. When an external force is applied to pull the handle 363 of the fixing and withdrawing mechanism 300, the actuating rod 306 of the fixing and withdrawing mechanism 300 is moved from the rebounding position 600 to the pulling position 601, and the guide surface 361 of the actuating rod 306 guides the protruding column 344 of the link rod 304 to move along the contact surface between the guide surface 361 and the protruding column 344, so as to guide the link rod 304 from the clipping position 501 towards the releasing position 500 (as shown in FIGS. 5A and 5B), so as to release the fastening state of the removable device 200. Meanwhile, the slide block is forced to move from the pushed position 401 to the returning position 400 under the restoring force of the first spring 303, and to push the clasp block 210 to the withdrawing position 112, such that the removable device 200 is withdrawn out of the accommodation space 110 of the main body 100.

Figure 10:
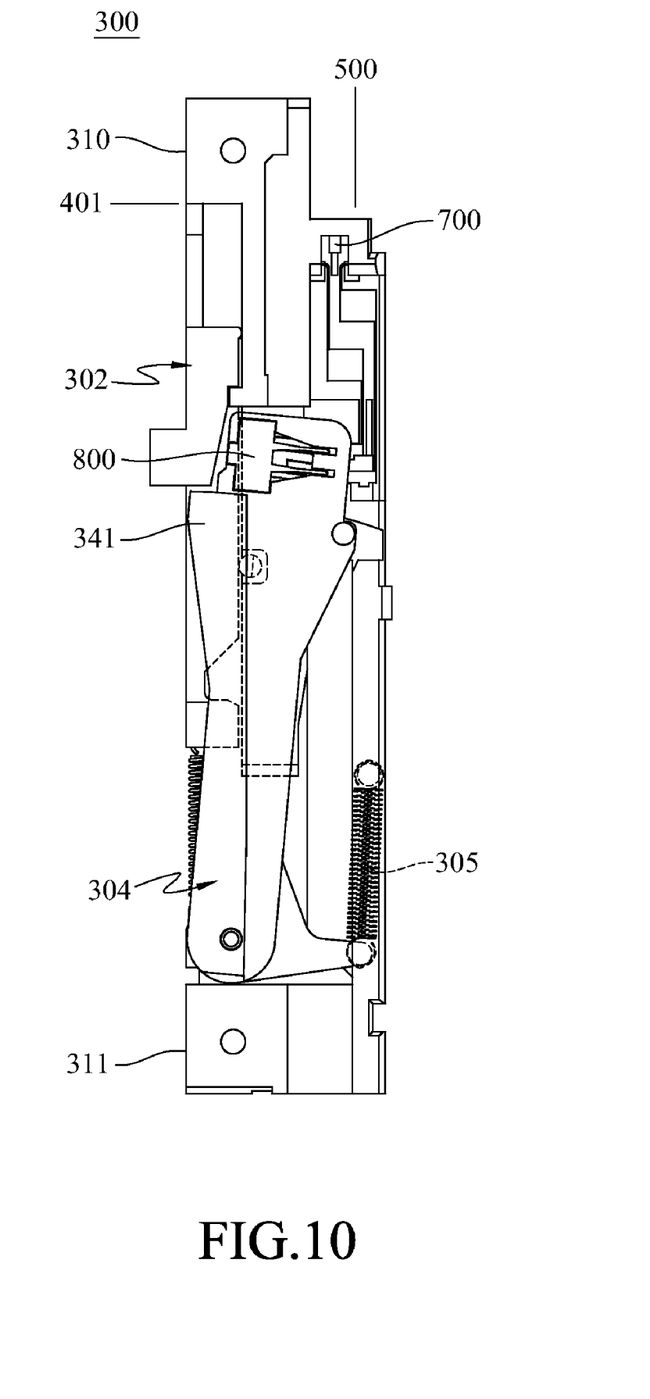
FIG. 10 is a schematic view of a fixing and withdrawing mechanism according to a second embodiment of the present invention, in which a connection port of the fixing and withdrawing mechanism forms a closed loop.
Figure 11:
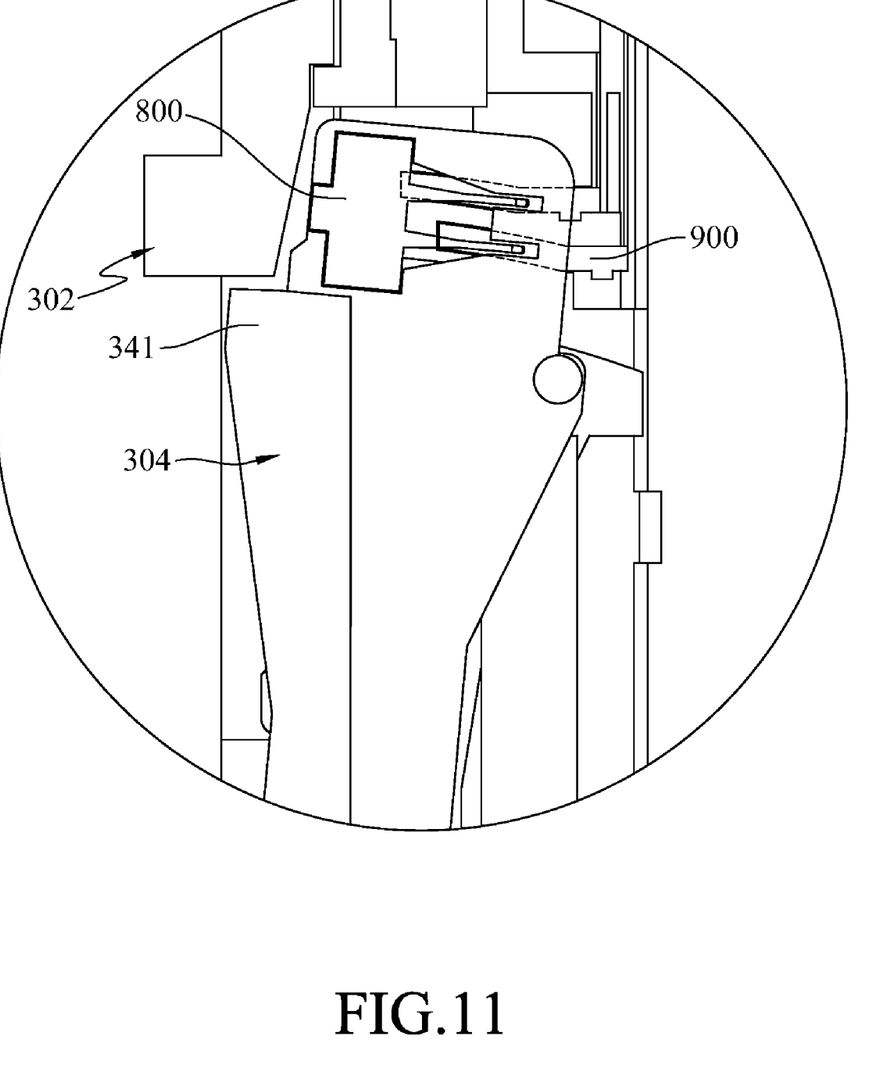
FIG. 11 is a partially-enlarged schematic view of the fixing and withdrawing mechanism according to the second embodiment of the present invention, in which the connection port of the fixing and withdrawing mechanism forms the closed loop.
Figure 12:
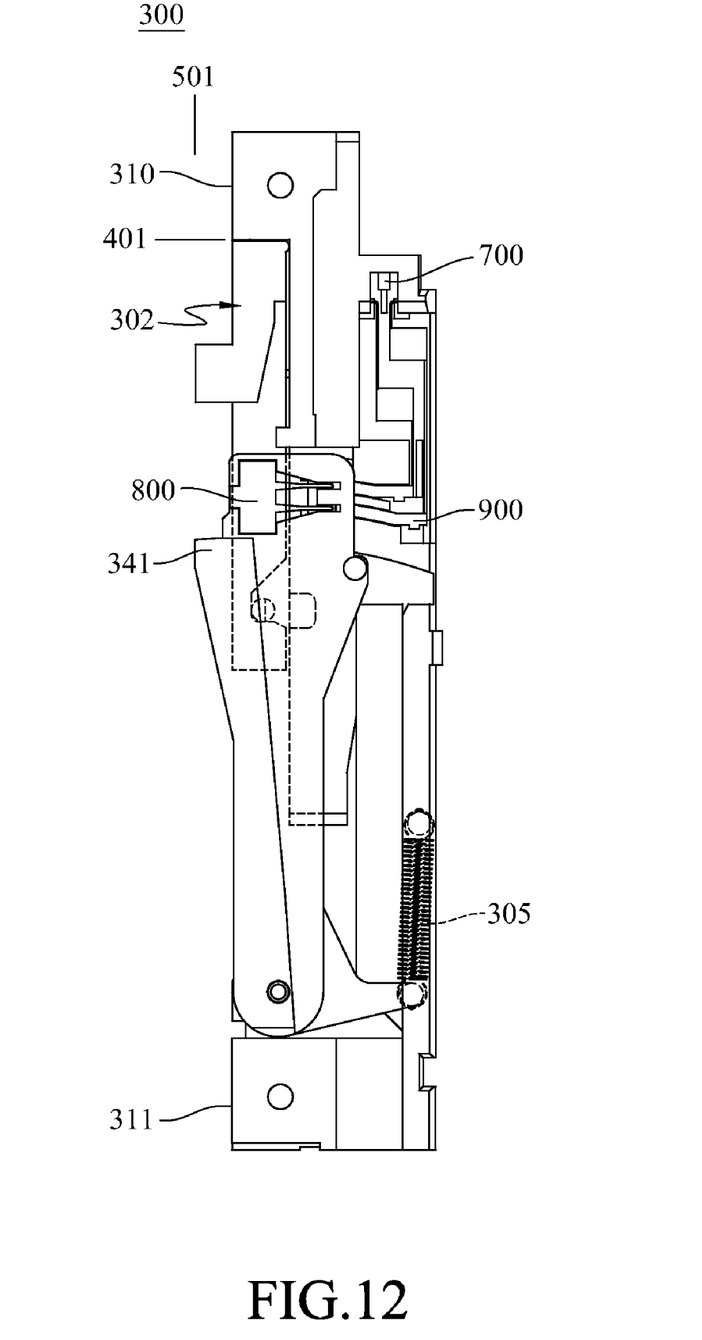
FIG. 12 is a schematic view of the fixing and withdrawing mechanism according to the second embodiment of the present invention, in which the connection port of the fixing and withdrawing mechanism forms an open loop.
Figure 13:
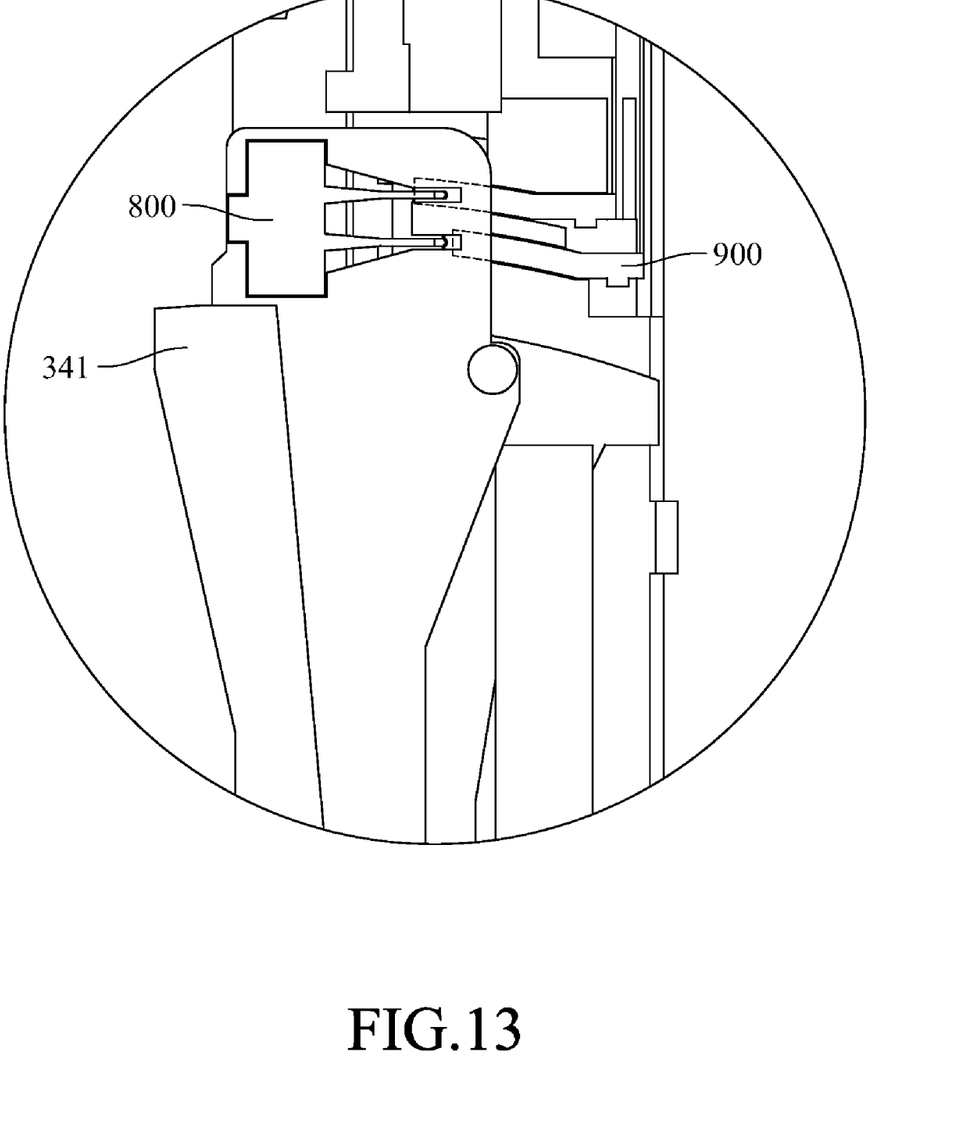
FIG. 13 is a partially-enlarged schematic view of the fixing and withdrawing mechanism according to the second embodiment of the present invention, in which the connection port of the fixing and withdrawing mechanism forms the open loop.

FIGS. 10 and 13 are schematic views of operations in the second embodiment of the present invention. Referring to FIGS. 10 and 13, the fixing and withdrawing mechanism 300 of the present invention has a connection port 700 and a conductive sheet 800. The connection port 700 has a junction 900. The connection port 700 is disposed on the first end 310 of the base 301 opposite to one side of the slide rod 302. The conductive sheet 800 is disposed on one end of the link rod 304 close to the stopper portion 341. When the link rod 304 leans against the slide rod 302 and is at the releasing position 500, the conductive sheet 800 of the link rod 304 contacts the junction 900, such that the connection port 700 is conducted to form a closed loop. When the slide rod 302 is pushed to reach the pushed position 401, the link rod 304 is forced to move towards the clipping position 501 under the restoring force of the second spring 305, and at this time, the conductive sheet 800 of the link rod 304 is separated from the junction 900, such that the connection port 700 forms an open loop.

In the fixing and withdrawing mechanism applied to the host with the removable device of the present invention, the clasp block of the removable device is used to push the slide rod of the fixing and withdrawing mechanism, so as to drive the link rod to clip the clasp block on the fixing position, such that the removable device is fixed on the host. Then, the actuating rod of the fixing and withdrawing mechanism is pulled, so that the link rod is guided by the actuating rod to release the clipping state of the clasp block, and thus the removable device is moved to a withdrawing position with respect to the host.

In the present invention, various elements of the fixing and withdrawing mechanism are combined together by means of snapping and are connected with each other by using the plurality of springs, and the removable device is fixed into or withdrawn out of the host through utilizing the cooperative effects among the elements, without locking the elements through using screws. Meanwhile, during the operation of releasing the fixed state of the removable device, it is only necessary to pull the actuating rod from the rebounding position towards the pulling position, such that the fixing and withdrawing mechanism of the present invention has characteristics of simplicity and convenience in both assembling process and manipulation.

What is claimed is:

1. A host with a removable device, comprising:
   a main body, provided with an accommodation space therein;
   a removable device, accommodated in the accommodation space, and having a clasp block, wherein the removable device slides between a fixing position and a withdrawing position of the main body with respect to the main body; and
   a fixing and withdrawing mechanism, comprising:
      a base, fixed on the main body;
      a slide rod, sliding between a returning position and a pushed position with respect to the base, and having a push block, wherein when the removable device is moved from the withdrawing position to the fixing position, the clasp block pushes the push block to force the slide rod to move from the returning position to the pushed position;
      a first spring, connected between the base and the slide rod, for pushing the slide rod towards the returning position under a normal state;
      a link rod, pivoted on the base to pivotally rotate between a releasing position and a clipping position, wherein the link rod has a protruding column and a stopper portion, when the link rod is at the clipping position and the removable device is at the fixing position, the stopper portion is clipped with the clasp block to fix the removable device on the fixing position;
      a second spring, connected between the base and the link rod, for pushing the link rod towards the clipping position under a normal state;
      an actuating rod, sliding between a rebounding position and a pulling position with respect to the base, and having a guide surface, wherein when the actuating rod is moved from the rebounding position to the pulling position, the guide surface guides the protruding column to force the link rod to move from the clipping position to the releasing position; and
      a third spring, connected between the base and the actuating rod, for pushing the actuating rod towards the rebounding position under a normal state.

2. The host with a removable device according to claim 1, wherein the fixing and withdrawing mechanism further comprises a cover plate, for wrapping the actuating rod, the link rod, and the slide rod in sequence, and buckled with the base, so as to limit the actuating rod and the slide rod to slid between the cover plate and the base, and limit the link rod to pivotally rotate between the cover plate and the base.

3. The host with a removable device according to claim 1, wherein the base has at least one positioning hole, for fixing the base on the main body.

4. The host with a removable device according to claim 1, wherein the fixing and withdrawing mechanism further comprises a connection port and a conductive sheet, the connection port is disposed on the base and has a junction; the conductive sheet is disposed on the link rod; when the link rod is at the releasing position, the conductive sheet conducts the junction, such that the connection port forms a closed loop; and when the link rod is at the clipping position, the conductive sheet is separated from the junction, such that the connection port forms an open loop.

5. The host with a removable device according to claim 1, wherein the host is a computer or a notebook computer.

6. The host with a removable device according to claim 5, wherein the removable device is a removable electronic device, and the removable electronic device is a floppy drive (FD), a hard disk drive (HDD), a compact disc-read only memory (CD-ROM), a compact disc-rewritable (CD-RW), a digital versatile disc (DVD), or a cell module.

7. The host with a removable device according to claim 5, wherein the removable device is a plastic module.

* * * * *